United States Patent Office 3,216,829
Patented Nov. 9, 1965

3,216,829
MONOGLYCEROL-FATTY ACID PREPARATION
Francis Frederick Hansen, 224 E. Poplar St.,
Walla Walla, Wash.
No Drawing. Filed Feb. 9, 1962, Ser. No. 172,100
11 Claims. (Cl. 99—118)

This invention is for a preparation comprising monoglycerides of fatty acids and a method of making the same.

Commercial monoglyceride derived from animal and/or vegetable fats or their fatty acids through esterification with glycerine and a catalyst commonly comprises about 40% monoglyceride, the balance being polyglyceride with diglyceride predominating and small amounts of other compounds. So-called high or concentrated monoglyceride comprises in excess of 70% monoglyceride with the balance being predominantly diglyceride, and is ordinarily available with 90% or higher monoglyceride, the balance being diglyceride with inconsequential amounts of triglyceride and other compounds.

The present invention relates to these high or concentrated monoglycerides, and particularly those derived from saturated or partially saturated or hydrogenated higher fat-forming fatty acids or their triglycerols, i.e., those having twelve or more carbon atoms, especially sixteen to eighteen carbon atoms. Fatty acids having more than eighteen carbon atoms are not ordinarily deemed edible or desirable for inclusion in food. Such fatty acid monoglycerides of this type are commonly derived from lard, edible tallow, or edible animal fats of various kinds, and vegetable sources, as palm oil, cottonseed oil, conconut oil, soya bean oil, peanut oil, etc.

These high monoglycerides are now extensively used as additions or with shortenings, to margarine, commercial icings and candies, ice cream and other food products made with fat. They are used because in shortenings, or in conjunction with shortenings, they improve the quality of the product or retard staling of bread and other baked goods. In margarine they modify melting characteristics, emulsify the fat, and hold liquid, etc., and in other foods in which they are used, they impart desirable characteristics. Monoglycerides used for this purpose are also sometimes further processed to enhance certain qualities, diacetyl tartaric acid esters of monoglycerides of fatty acid (TEM) being one such product that has been reesterified for such purpose. This, however, is relatively expensive and the amount which may be used advantageously is limited because of the acetic acid content. In excess of a limited critical amount, this compound may adversely affect the product.

An object of the present invention is to modify physically the structure of monoglyceride to substantially enhance the qualities for which it is used and enable it to be more readily incorporated into and more completely dispersed into and through the products in which it is used.

An important object of the present invention is to provide a monoglyceride fatty acid preparation which has improved qualities, particularly in foods, where monoglyceride or TEM has heretofore been used and which, whether used alone or with shortening, imparts to bread and baked goods superior anti-staling qualities and improved crumb and texture.

A further object of this invention is to provide a novel preparation comprising a water-monoglyceride fatty acid colloid system.

A further important object of this invention is to provide colloidal monoglyceride. Other important objects are to provide a colloidal monoglyceride either in paste or dry form and to impart to monoglyceride improved qualties and with which optimum benefits can be obtained, even with smaller amounts, in various formulae in which monoglyceride is used.

These and other objects and advantages are derived from this invention, as will hereinafter more fully appear.

I have discovered that if high or concentrated monoglyceride of fully or partially saturated higher fatty acid is heated and melted and an equal weight of water heated to near its boiling temperature be then added thereto, a semi-transparent medium viscosity gel will almost immediately form and it will persist as long as the monoglyceride is kept at a temperature above its melting point, but will disappear and segregation of the monoglyceride and water will take place if it be allowed to cool. If, however, it is beaten or whipped vigorously as it is cooled, it will form a smooth, white plastic mass resembling in appearance a plastic vegetable shortening, or cosmetic cold cream in which the monoglyceride exists in a colloidal state. This cold cream-like material will remain stable indefinitely at room temperatures, provided that evaporation of water is prevented, and if protected from mold. One-half of one percent of sodium or calcium propionate or 0.1% of sodium benzoate may be used in the product in commercial manufacture to inhibit mold. Under refrigeration mold growth may also be prevented. While the basic system requires approximately equal amounts of monoglyceride and hot water, its plasticity, bulk, and commercial utility can be further improved if, during cooling and beating, additional hot water up to the amount of the water first used be added, more or less gradually. This produces a more fluffy, more easily dispersible colloidal system or product.

Also, if in lieu of using hot water in the second phase during beating and cooling there is used instead corn syrup or reconstituted corn syrup solids or similar syrup having low vapor pressure characteristics and which therefore retards evaporation of water, there will result a plastic product which will dry less readily upon exposure to air, and which increases aeration and volume of the product and aids in the dispersion of the colloid in any formula where the product is used.

In place of using corn syrup, part or all of it may be replaced with glycerine. A highly satisfactory product is derived where 20% of the corn syrup is replaced with glycerine which is beaten into the gel in a heated condition along with the corn syrup, so that the finished product comprises one-third high monoglyceride, one-third water, and one-third of a mixture of 80% corn syrup and 20% glycerine. Both glycerine and corn syrup are hydrophilic, both retard evaporation, and neither is hostile to the monoglyceride-water dispersion after it has been formed by the initial step of combining the heated monoglyceride product and water. This is a typical formulation and the proportions are not critical. The monoglyceride is melted, the one-third water is heated close to boiling temperature, at least to a temperature somewhat higher than the melting point of the monoglyceride, the two are mixed, and the mixture is then vigorously beaten while the heated corn syrup and glycerine mixture is added more or less gradually instead of being dumped in all at one time. The temperature of the corn syrup or corn syrup and glycerine, or of the water added in the second stage should be close to and above the melting temperature of the monoglyceride.

On an average, the colloidal system therefore contains one-third high monoglyceride of fatty acid, and two-thirds of water, or one-third of high monoglyceride of fatty acid, one-third water, and one-third corn syrup or other sugar syrup, but where corn syrup or other syrup is used, the proportion of syrup may be somewhat increased, inasmuch as the suspension of monoglyceride and water will accept more of the syrup than it will water. Also, as above stated, part or all of the corn syrup may be replaced with glycerine, or mixtures of water and syrup, water and glycerine, or of all three may be used.

The monoglyceride and the water appear to become mutually bonded in a manner presently not understood by me. If a lump of the material is placed in water, it floats for an indefinite period of time without undergoing dissolution or disintegration as would be expected, and if it is beaten up with water it does not emulsify but upon standing after being so mixed, the plastic colloid material will segregate and float on the surface of the water.

The vigorous agitation of the gel when cooling is important, but it appears to make no difference whether it is beaten in the open air or in a water-jacketed closed beater, such as a votator that could be used in a continuous method of production. Utilizing a batch process, and an ordinary mixer such as used in the preparation of cake batter, the beater speed should be between 200 and 800 r.p.m., depending on the rate of cooling. The speed is increased as the cooling rate is increased. No empiric conditions can be established, but obviously there is no point in using excessively high speeds and if the speed is not sufficient, there will be an observable grainy texture in the paste or cream which destroys the optimal dispersibility of the product.

After the colloidal system or product has been made, it can be whipped in air into a froth, expanding its volume as much as six times, and where corn syrup is used in place of the second water addition, the tiny bubbles of the whipped material will be particularly strong and lasting.

I have found, however, that if corn syrup, even though heated, is used in place of near boiling hot water first used, the initial gel will not form, or at least not form satisfactorily, and I have found this to be true if appreciable quantities of ionizable electrolytes such as salt, vinegar, sugar, bicarbonate of soda, potassium tartrate and others be initially present in the mix. They interfere with the spontaneous initial gel formation.

Another peculiarity about the colloid is that it may be dried, either alone or admixed with a farinaceous material, that is a powdery or flour-like edible material, such as wheat flour or corn starch or with sodium caseinate, using spray drying in air as with milk, and stored in this condition. It may be readily reconstituted with water to the original plastic condition, indicating that the monoglyceride has undergone a definite physical change, or some structural modification of the monoglyceride has been effected, as otherwise one would expect that drying would simply restore the glycerol-fatty acid compound to its original granular form where it would again have its usual hydrophobic attributes immiscible into a homogeneous dispersible plastic condition or smooth creamy colloidal paste.

One way to dehydrate the paste-like material, or even to use it in a mixing procedure, especially a continuous mixing process, is to beat the collidal paste-like material into water, using a comminuting and stirring action like that obtained in a food blender, and then centrifuging the mixture or otherwise removing excess free water and produce a slurry that can be pumped into the spray drying chamber or by a metering pump into mixing equipment, such as, but not necessarily a continuous type of mixer where it is mixed with other ingredients, such as a dough forming mixer to thereby more quickly diffuse it through the mix.

Another drying procedure is to mix the colloid paste with water, roughly about one part of colloid to three parts of water. The mix is then homogenized under high pressure at least 500 p.s.i. and then spray-dried in a tower. With this mix soluble additions or solids, such as milk powder, sodium caseinate and the like may be added and dissolved in the excess water and homogenized and spray dried, the dissolved ingredients being then intimately embodied in the dried product.

This dried material may be advantageously used in dry mix preparations, such as packaged cake mixes and the like, or elsewhere where dry storage is desirable. This dessicated or dehydrated monoglycerol material produced as above described may include in lieu of starch, or in addition thereto, dried milk powder. The amount of dry milk or farinaceous material is desirably around 10% by weight of the colloid. It is not necessary but for certain uses, as in dry mixes, may be desirable since it gives added bulk to the product.

Typical high monoglycerol-fatty acid materials used by me in tests hereinafter referred to are manufactured by Distillation Products Division of Eastman Kodak Company, and are made from hydrogenated lard and hydrogenated cotton seed oil, and they are both presently available under the trademark "Myverol." This is a distilled monoglyceride product. Monoglycerol palmitate, or mixtures containing the same, are other specific saturated higher fatty acid glycerol materials that I have successfully used, as well as various hydrogenated or partially saturated fatty acid monoglycerides. It is important that the monoglyceride be derived from an animal or vegetable fat that at least partially solidifies at room temperature of 70° F., and any animal or vegetable oils that are entirely liquid at this temperature are highly unsaturated and not useful for my product. Some evidence indicates that the higher the degree of saturation of the fatty acid, the better are the results of using monoglyceride in baking, but as presently employed, the highly saturated monoglyceride is less readily dispersed through the mix than the material prepared from less fully saturated fatty acid ester. However, because of the colloidal nature of the product obtained by me, the material of the present invention may go all the way into fully saturated fatty acids because it is much more readily dispersed.

Experimental work with ordinary commercial grades of monoglyceride having around 40% of monoglyceride fail to yield the results attained by the use of a high monoglyceride fatty acid base, i.e., one in which the monoglyceride exceeds 70% and in which the remainder is predominantly diglyceride, since with this commercial grade material an initial satisfactory gel does not form.

The colloid of this invention used in the manufacture of ice cream is far superior to mono and mono-diglycerol fatty acid preparations now generally used to improve the emulsification of fats in ice cream formula. The oven-run using my product is superior, showing greater aeration qualities, with less forming of ice crystals in the finished product. Greater smoothness in the mouth and better taste were noticeable. The colloidal product may be successfully used in dry mix ice cream formulae to be used by the housewife. Of particular interest is a frozen product for dietary purposes using this colloid with an artificial sweetener but little or no sugar or butter, but using powdered milk and gelatin; the colloid being used to avoid the usual ice crystals and provide good aeration and smoothness and over-run. Such a product is of low caloric value. Also my colloid has been used with good success to reduce ice crystals and lend smoothness and lightness to frozen desserts known as "ices" where fats are normally not used.

The colloid may be advantageously used in margarine in place of or in conjunction with lecithins and mono and diglycerides now employed to improved melting qualities and water-holding capacity.

The colloid adds superior qualities to honey, preventing it from sugaring on aging, and in cake icing and fudge imparts smoothness and prevents hardening and retards sugar crystal growth.

These properties are attributable to the ability of the colloid to disperse so completely through the product, apparently to a film of molecular thickness, so it entirely coats the individual particles or cells of the food. A relatively small amount of the colloid is effective in a large mass into which it is mixed. Dispersed through a baked product it retards the migration of moisture through the product into which it is mixed, and retards crystal growth or the clumping together of starch granules, sugaring or staling.

Specifically, staling of bread is measured in one way by what is known as a Baker Compressometer. This instrument measures the compressibility of the bread on several successive days beginning with a day when the bread is already three or more days old. The compressibility with this instrument is determined by measuring the distance which a rigid disk moves downwardly when brought against a face of a slice of standard thickness under a weight exerting a measured force on the disk, the reading being made immediately after the weighted disk is applied to the bread so that there is a negligible time factor. The results of the successive readings are averaged. The softer the bread, the greater compressibility, and therefore a high score or average is an indication of slower staling or hardening of the bread. The test is conducted against a comparison loaf made at the same time from the same flour under the same conditions and of the same size, baked at the same time and cooled in the same way. In such tests conducted for me, bread was prepared by the sponge and dough method. Lard was used as shortening, the shortening being 4% by weight of the flour. In one batch colloid of the present invention was used in the mix in such amount that there was introduced into the sponge stage 1% of high monoglyceride based on the weight of flour to be used. This colloid comprised 33⅓% high monoglyceride in the form of glycerol stearate, 20% corn syrup, and 46⅔% water, so that actually 3% of colloid was used to provide 1% equivalent monoglyceride. The lard was added in the dough stage. Another batch was prepared in the same way, except that there was used 1% TEM in place of the monoglyceride, TEM being used because it is considered to keep bread soft or fresh longer than any other additive, and 1% of TEM based on the weight of flour is considered to give the best results.

Seventeen tests were made on each of four days. The bread for each series of tests was baked on a Thursday night, and the initial test was made the following Monday. Seventeen tests were made on each bread sample each day, and the score for the day for each kind of bread was averaged, and the averages for the four days were averaged. Bread made with the colloid as above described had a compressometer score of 34.75 as against 29.5 where the loaves were baked with TEM. In the scoring the weight exerted a force on the disk of 27 grams in both cases. This is a significant difference.

To prove that the colloid of this invention functions without the aid of shortening, I made another series of tests in which no shortening was used except the colloid. I here used enough of the colloid above described in the first test to supply 1% equivalent of the high monoglyceride. Comparison was made with other loaves made at the same time from two batches of dough, each containing 4% of lard, one having 1% of TEM and the other 1½% of a widely used high monoglyceride additive. Seventeen compressometer tests as above described were made each day on loaves from each batch for five days beginning with the Monday following the Thursday night on which the bread was baked, i.e., Thursday night extending into early Friday. The average for all tests for bread made using the colloidal concentrated monoglyceride of my invention without shortening was 41.4; for the sample using TEM and shortening 42.0, and for the third batch 31.3. The bread using no shortening except the colloid high monoglyceride was of good texture, volume, taste and chewability. Other tests were made using TEM without shortening, and using another widely used so-called emulsifier, and volume was seriously impaired, and the bread staled quite rapidly. These tests proved that the colloidal monoglyceride is a distinctive product—quite different from normal high monoglyceride or the emulsifiers used with it.

Numerous other tests have been run varying the amount of the colloid; utilizing all water in the colloid in place of corn syrup, and to determine the effects of glycerine and utilizing the dried product, all establishing the utility and superiority of this colloidal glycerol-fatty acid preparation.

Regulations of the Department of Health, Education and Welfare establish the extent to which monoglycerides may be used in foods. The colloid of the present invention, since it introduces only such ingredients as are recognized and approved food products, is compatible with such regulations, and it may be used in such amount as to give the permitted monoglyceride equivalent. However, as above indicated, a lesser amount of the colloid will satisfy the specified requirement of normal high monoglyceride in a particular formula.

In carrying out the invention the monoglycerol-fatty acid material is heated until it is melted, preferably above its melting point. In most of my work I have heated it to about 200° F. so that it would still be at or above its melting temperature after it was introduced into the beater. On an average, about the same weight of water heated almost to, but a few degrees below boiling, is mixed therewith and the gel will form spontaneously and will remain as long as the temperature of the mixture is above the melting point of the glycerol-fatty acid material. The vigorous beating must be started before this gel disappears, and continued while the mixture cools. Employing for experimental work a household electric mixer ("Sunbeam"), I have used beater speeds from 200 to 800 r.p.m., the speed being preferably higher where the rate of cooling is faster. The resulting cream-like paste or plastic mass is the basic colloid, but as noted above, the physical condition of the mass is improved if more heated water is added during the beating, but the maximum amount so added should not substantially exceed the amount first used, and should only be added after the gel has formed and during the beating. All of the water so used is combined in the paste, but if the colloid be then beaten up with additional water, the additional water will separate out and the colloid containing one part of the monoglycerol-fatty acid and about two parts of water will float on the free water. It therefore appears that about or approximately two parts by weight of water will combine in some fashion with one part of monoglycerol-fatty acid, and that beating into the colloid additional water does not result in the colloid system being destroyed or broken down. In a dough or other food product, however, such segregation of excess or free water and the colloid cannot occur and the colloid appears to distribute over the surface of individual particles as a molecular film, the colloid having an immense property to disperse through a mix, and thus retard capillary or moisture vapor migration of water or the coalescence or clumping of solid particles. The colloid mix in itself contains water combined with it, thereby providing additional but combined moisture in the product to be evaporated in the process of staling. In other words, by using the water-monoglyceride paste or cream, extra water may be added to the dough without making the dough pasty or sticky since with my product water is held in the colloidal system.

The process may be practiced either as a batch process or continuously, effecting the beating and cooling in steam or water-jacketed heated and cooled beaters or votators now available in the food industry and through which the product flows at a controlled rate. In such a continuous system the colloid would be formed in a first votator, beaten in a second, and in a succeeding one the additional water or syrup would be added. Spray drying or other conventional drying procedures may be effected where a dry product is desired by air drying as used in the food industry, but temperatures above the melting temperature of the monoglyceride during drying must be avoided. As heretofore indicated, the material may be dried without incorporating flour or starch, or up to about 10% by weight of farinaceous material may be included. Syrup, like corn syrup, containing dextrins, dextroses, etc., are preferable to ordinary syrup comprised of a solution of sugar in water, both because it has low vapor pressure charasteristics plus various inherent humectants, and thus aids in producing more aeration when the mixture is whipped.

While my invention provides a colloidal form of monoglyceride of a fatty acid having especial utility in the food industry and the preparation of comestibles, it is not confined to such use but may be used in various commercial preparations where monoglyceride is used.

I claim:

1. The method of preparing a new and useful composition of matter in the form of a stable plastic cream comprising heating a monoglyceride of fat-forming fatty acid selected from the group consisting of fatty acids having fatty acid radicals of 16 carbon atoms and fatty acids having 18 carbon atoms and mixtures thereof in which the monoglyceride product is a solid at room temperature, the balance of the product consisting principally of diglyceride and triglyceride with the monoglyceride being in excess of 75% of the total, said method comprising heating the monoglyceride product to a temperature above its melting point, mixing into the melted product about the same amount by weight of water which is heated to a temperature at least as high as the temperature of the monoglyceride product whereby a gel is formed and immediately beating the gel while it cools to a temperature at which the monoglyceride product is normally solid.

2. The method of preparing a new and useful composition of matter in the form of a stable plastic cream comprising heating a monoglyceride product comprised principally of monoglyceride of fat-forming fatty acids having from 16 to 18 carbon atoms and in which the monoglyceride product is solid at room temperature, said product having in excess of 75% of monoglyceride, the balance being principally diglyceride and triglyceride, said method comprising heating the monoglyceride product to a temperature above its melting point, mixing into the melted product at least an equal weight of water, put not more than twice as much water by weight as the melted product, with the water heated to a temperature at least as high as the temperature of the melted monoglyceride product to thereby form a gel, and immediately beating the gel and continuing the beating while the mix cools to a temperature below the melting temperature of the monoglyceride product.

3. The method of preparing a new and useful composition of matter as defined in claim 2 in which a volume of water equal in weight to the weight of the monoglyceride product is first mixed with the monoglyceride and beaten and the remainder of the water at the same temperature as the water first used is added to the mix after the beating together of the water first added and the monoglyceride product and before the mix has substantially cooled.

4. The method of preparing a new and useful composition of matter in the form of a stable colloidal dispersion of a distilled monoglyceride product comprised principally of fatty acid monoglyceride selected from the group consisting of fatty acids having radicals of not less than 16 carbon atoms and not exceeding 18 carbon atoms and mixtures thereof, said product being a solid at room temperature, said product comprising about 90% monoglyceride, the remainder being principally diglyceride and triglyceride, said method comprising melting the monoglyceride product and heating it to a temperature of around 200° F., mixing into the melted product an equal weight of water which is heated to a temperature approximately the same as the temperature of the monoglyceride product to form a gel, immediately beating the gel to form an initial dispersion of the monoglyceride product and the water and thereafter adding to the mix a second volume of water heated to about the same temperature as the first and about equal in volume to the first, and continuing the beating of the entire mix until it cools to a temperature below the normal melting temperature of the monoglyceride product.

5. The method of preparing a new and useful composition of matter in the form of a stable colloidal dispersion of a distilled monoglyceride product comprised principally of fatty acid monoglyceride selected from the group consisting of fatty acids having radicals of not less than 16 carbon atoms and not exceeding 18 carbon atoms and mixtures thereof, said product being a solid at room temperature, said product comprising about 90% monoglyceride, the remainder being principally diglyceride and triglyceride, said method comprising melting the monoglyceride product and heating it to a temperature of around 200° F., mixing into the melted product an equal weight of water which is heated to a temperature approximately the same as the temperature of the monoglyceride product to form a gel, immediately beating the gel to form an initial dispersion of the monoglyceride product and all of the water and thereafter adding to the mix corn syrup heated to a temperature of about 200° F. and in an amount substantially equal in weight to the weight of the monoglyceride product and continuing the beating of the mix until it has cooled to a temperature below the melting point of the monoglyceride product, the corn syrup serving to retard evaporation of water from the resulting dispersion.

6. The method of preparing a new and useful composition of matter in the form of a stable colloidal dispersion of a distilled monoglyceride product comprised principally of fatty acid monoglyceride selected from the group consisting of fatty acid radicals of not less than 16 carbon atoms and not exceeding 18 carbon atoms and mixtures thereof, said product being a solid at room temperature, said product comprising about 90% monoglyceride, the remainder being principally diglyceride and triglycedire, said method comprising melting the monoglyceride product and heating it to a temperature of around 200° F., mixing into the melted product an equal weight of water which is heated to a temperature approximately the same as the temperature of the monoglyceride product to form a gel, immediately beating the gel to form an initial dispersion of the monoglyceride product and all of the water and thereafter adding to the mix glycerine heated to a temperature of about 200° F. and in an amount substantially equal in weight to the weight of the monoglyceride product and continuing the beating of the mix until it has cooled to a temperature below the melting point of the monoglyceride product, the glycerine serving to retard evaporation of water from the resulting dispersion.

7. A method of preparing a new and useful composition of matter in the form of a stable plastic spreadable creamy dispersion of colloidal monoglyceride of a fat-forming fatty acid selected from the group consisting of fatty acids having 16 carbon atoms and 18 carbon atoms and mixtures thereof, which monoglyceride product is a solid at room temperature, the product comprising about 90% monoglyceride with the balance being principally diglyceride and triglyceride, said method comprising heating the monoglyceride product to a temperature above its melting point and to about 200° F., mixing into the melted product at least an equal weight of water which is heated to approximately the same temperature to form a gel, immediately beating the gel vigorously and adding to the mix after it has been initially beaten and all of the water and monoglyceride have formed a homogeneous dispersion, a second volume of a liquid equal in weight to the monoglyceride product of a liquid selected from the group consisting of water, glycerine, corn syrup and mixtures thereof.

8. A process of preparing a new and useful composition of matter in the form of a stable plastic spreadable creamy dispersion of colloidal monoglyceride product of a fat-forming fatty acid selected from the group consisting of fatty acids having 16 carbon atoms and 18 carbon atoms and mixtures thereof, which monoglyceride product is a solid at room temperature, the product comprising about 90% monoglyceride with the balance being principally diglyceride and triglyceride, said method comprising heating the monoglyceride product to a temperature above its melting point and to about 200° F., mixing into the melted product at least an equal weight of water which is heated to approximately the same temperature to form a gel, immediately beating the gel vigorously and adding to the mix after it has been initially beaten, and then adding a second volume of liquid also equal in weight to the monoglyceride product and comprising from between 0 to 100 parts of water to 0 to 100 parts of glycerine.

9. The process of preparing a distilled monoglyceride-fatty acid product of a fatty acid which is solid at room temperature and which is derived from a fatty acid having from 16 to 18 carbon atoms, which product has in excess of 75% monoglyceride and the balance being principally diglyceride and some triglyceride, which process comprises heating the distilled monoglyceride product to a temperature above its melting point, mixing with the melted product a substantially equal weight of water heated to at least the same temperature as the product to form a gel, beating the gel vigorously and at the same time cooling it, adding to the gel as it is being beaten a compatible heated liquid from the group consisting of water, corn, syrup, glycerine and mixtures thereof in an amount not substantially exceeding the weight of the water first added, thereafter air-drying the resulting product and converting it to a powder.

10. The process of preparing a monoglyceride fatty acid material from a distilled monoglyceride-fatty acid product of a fatty acid which is solid at room temperature and which is derived from a fatty acid having from 16 to 18 carbon atoms and which is constituted principally of monoglyceride with not substantially more than 10% of mixed diglyceride and triglyceride and with the diglyceride exceeding the triglyceride, which process comprises heating the distilled monoglyceride product to a temperature above its melting point, mixing with the melted product a substantially equal weight of water heated to at least the same temperature as the product to form a gel, beating the gel vigorously and at the same time cooling it, adding to the mixture as it is being beaten a heated liquid selected from the group consisting of water, corn syrup, glycerine and mixture thereof in an amount not substantially exceeding the weight of the water first added, thereafter mixing into the resulting product an edible powder selected from the group consisting of cereal flour, starch, dry milk powder and sodium caseinate, drying the mixture and converting the mix to a powder.

11. The method of preparing a colloidal monoglyceride which comprises heating to above its melting point a glycerol-fatty acid product in which the fatty acid is selected from the group consisting of saturated, partially saturated and hydrogenated fatty acids and mixtures thereof and in which the fatty acid is one having 16 to 18 carbon atoms and is solid at a temperature of 70° F., the product comprising at least 90% monoglyceride, adding to the hot melted product an amount of water heated to at least as high as the temperature of the monoglyceride product in an amount at least equal to but not more than twice the weight of the product to form a gel, and then vigorously beating the gel while cooling it.

References Cited by the Examiner
UNITED STATES PATENTS

| | | | |
|---|---|---|---|
| 2,895,879 | 7/59 | Brokaw et al. | 260—410.7 X |
| 2,932,574 | 4/60 | Bour | 99—118 |
| 2,976,251 | 3/61 | Brokaw et al. | 252—316 |
| 3,111,409 | 11/63 | Jackson et al. | 99—91 |

OTHER REFERENCES

Brokaw et al.: J. American Oil Chemists Society, January 1958, 35, No. 1, pages 49–52.

Distillation Products Industries, Eastman Kodak Co., Rochester, N.Y., Technical Bulletin, October 10, 1958, "Myverol Distilled Monoglycerides as Ice Cream Emulsifiers," pages 1–4.

A. LOUIS MONACELL, *Primary Examiner.*

TOBIAS E. LEVOW, *Examiner.*